United States Patent Office 3,361,768
Patented Jan. 2, 1968

3,361,768
TOCOPHERAMINES
Wolfgang Schlegel, Riehen, Ulrich Schwieter, Reinach, Basel-Land, and Rudolf Tamm, Riehen, Switzerland, assignors to Hoffmann-La Roche Inc., Nutley, N.J., a corporation of New Jersey
No Drawing. Filed Dec. 14, 1964, Ser. No. 418,322
Claims priority, application Switzerland, Dec. 20, 1963, 15,751/63
21 Claims. (Cl. 260—345.2)

ABSTRACT OF THE DISCLOSURE

N-mono and di-alkyl tocopheramines which show Vitamin E activity and are useful as antioxidants in foods or feedstuffs.

The present invention relates to amines and to processes for their preparation. More particularly, the invention relates to amines of the formula

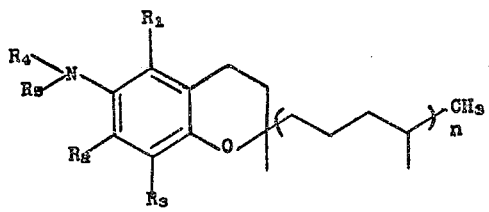

I wherein $n$ is a natural number from 0 through 3; $R_1$, $R_2$ and $R_3$ are each hydrogen or methyl, $R_4$ is alkyl, preferably lower alkyl, and $R_5$ is hydrogen or alkyl, preferably lower alkyl.

Particularly preferred compounds of Formula I are those wherein $n$ is a whole number from 1–3 (especially 3), and wherein $R_4$ is methyl and $R_5$ is hydrogen or methyl; i.e., the particularly preferred compounds of the invention have the formula:

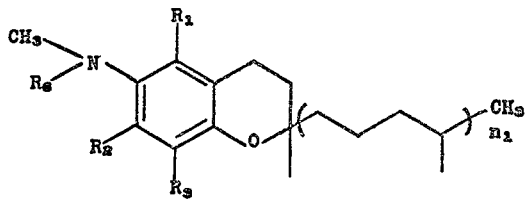

Ia wherein $R_1$–$R_3$ have the above meaning; $n_1$ is a whole number from 1 to 3 inclusive, and $R_6$ is hydrogen or methyl.

When the term "lower alkyl" is used in the specification, it is to be understood to mean a straight or branched chain alkyl group having from 1 to 7 carbon atoms, e.g., methyl, ethyl, isopropyl, tert. butyl, etc.

The process of the invention is carried out by reacting a compound of the formula:

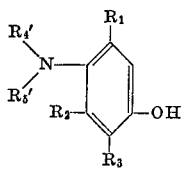

II wherein $R_1$, $R_2$ and $R_3$ have the same meaning as above and $R_4'$ is hydrogen or alkyl and $R_5'$ is hydrogen, acyl or alkyl, with either (a) a compound of the formula

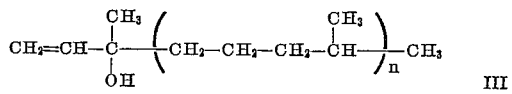

III or (b) a compound of the formula

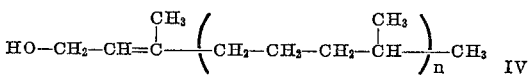

IV in which $n$ has the same meaning as above, or an ester of III or IV. Esters of III and IV that can be employed include lower alkanoyl esters, i.e., wherein the —OH groups of the above compounds are replaced by a group of the formula

wherein R is hydrogen or a straight or branched chain alkyl group having from 1 to 6 carbon atoms.

In Formula II above, when $R_5'$ is acyl, the acyl group is preferably lower alkanoyl, i.e., having the formula

wherein R has the above meaning.

When the products of the above reaction contain an acyl group, this acyl group can be reduced or hydrolyzed off, as described more fully hereinafter.

The primary amines of Formula II (i.e., when $R_4'$ and $R_5'$ are both hydrogen) used as starting materials can be prepared from the corresponding substituted phenol compounds by nitration, nitrosation or coupling with a diazo compound and subsequent reduction. These amines can be alkylated or acylated in a known manner to give other starting materials of Formula II.

The reaction of the amine of Formula II with a compound of Formula III or IV is conveniently effected in the presence of an acid agent and with the use of a solvent. For example, the reaction can be undertaken in the presence of a lower alkane carboxylic acid (e.g. acetic acid, or, especially, formic acid). The formic acid can itself also serve as the solvent. An inert solvent can optionally be employed; for example, aromatic or aliphatic hydrocarbons (such as benzene, toluene or high-boiling petroleum ether), ethers (e.g. dioxane) or chlorinated hydrocarbons (e.g. chloroform). The reaction is conveniently undertaken at a temperature between room temperature and the boiling temperature of the reaction mixture. Advantageously, equimolar amounts of both starting compounds or a slight excess of the compounds of Formula III or IV are employed. The mixture is preferably heated for some hours (e.g. about 2 to about 24 hours) at a temperature of more than about 50° C. Where the starting compound of Formula II contains a free amino group, acylation is effected to some extent under the conditions of the reaction. The compounds of Formula III or IV are preferably employed as alcohols; they can, however, also be present in the form of their esters.

According to another procedure, the reaction of the amines of Formula II with the compounds of Formula III or IV is effected in the presence of Lewis-acids or strong mineral acids, for example, zinc chloride in hydrochloric acid, boron trifluoride etherate, aluminum chloride, sulphuric acid, phosphoric acid or hydrochloric acid can be used as the acid agent. The reaction can be undertaken in the absence or, preferably, in the presence of an inert solvent; for example, in the presence of an aromatic or aliphatic hydrocarbon (such as benzene, toluene or high-boiling petroleum ether), an ether (such as dioxane) or a chlorinated hydrocarbon (such as chloroform). The reaction is conveniently undertaken with heat, especially at a temperature above about 50° C. up to the boiling temperature of the reaction mixture, whereby the reaction time generally is about 2 to about 14 hours, depending on the temperature. Also, about equimolar amounts of both reaction partners or a slight excess of the compounds of Formula III or IV are advantageously used in this procedure.

Where the condensation products contain acylated amino groups, the acyl groups can be reduced to alkyl groups in a known manner by catalytic hydrogenation, or, preferably, chemical reduction (e.g. with the use of a complex metal hydride such as lithium aluminium hydride). The reduction with lithium aluminium hydride is conveniently effected in an inert solvent (e.g. in tetrahydro-furan). Acyl groups which are present can also be split off hydrolytically, e.g. by treatment with aqueous sodium hydroxide.

Condensation products which possess a free amino group or a monoalkylated or monoacylated amino group can be alkylated in a known manner. This alkylation can be carried about, for example, by treatment with acids or their functional derivatives, e.g. acyl halides or anhydrides, which are capable of reaction and subsequent reduction. The reduction can be effected as previously described. The amino groups can also be directly converted into alkylamino groups with treatment with alkylation agents such as alkyl halides or alkyl sulfates.

The products of the process possess very good antioxidant activity so that they are useful for the stabilization of oxidation-sensitive materials (e.g. of foodstuffs or feedstuffs, vitamin preparations or cosmetics). Since they show only an extremely slight toxicity, they are quite useful in foods or feedstuffs. Also, some of the products of the process show high vitamin-E activity (e.g. in the case of N - methyl - β - tocopheramine or N-methyl-γ-tocopheramine).

In the following examples the notation by Greek letters which is in use for the various tocopherols is also applied to the corresponding amines.

EXAMPLE 1

1 liter of formic acid (99%) is distilled and added to 120 g. of 2,3,5-trimethyl-4-formylamino-phenol. 200 g. of isophytol are added thereto and stirred for 22 hours under nitrogen at 135° under reflux conditions. After cooling, the reaction mixture is poured onto 2 kg. of ice, whereby a brownish oil separates out. The oil is extracted three times with ether, the ether solution washed three times with 400 ml. of 10% caustic soda each time, then with water up to a neutral reaction and finally with saturated sodium chloride solution. After drying over sodium sulfate, the solution is concentrated under reduced pressure. The formyl-α-tocopheramine which is obtained in the form of an oily residue is taken up in 1200 ml. of absolute alcohol, treated with 350 ml. of concentrated hydrochloric acid and boiled at reflux for 4 hours. After concentration in a vacuum the α-tocopheramine hydrochloride which is obtained as the residue is taken up in 500 ml. of chloroform, shaken with 500 ml. of 10% caustic soda, washed neutral with water, shaken with saturated sodium chloride solution and dried over sodium sulfate. The solution is now evaporated to dryness in a vacuum and there is obtained a brownish colored oil which is taken up in a small amount of benzene and is purified on a column of 2.5 kg. of silica gel. 130 g. of pure α-tocopheramine are obtained by elution with petroleum ether/ether mixtures; boiling point 200–203° C./0.01 mm.; absorption maxima at 300 m$\mu$ ($E_1^1$=85) in rectified alcohol.

19.5 g. of α-tocopheramine are heated to 100° C. for one hour after the addition of 30 ml. of acetic anhydride, 30 ml. of glacial acetic and 0.3 g. of zinc. After cooling, the mixture is treated with 30 ml. of ethanol, left to stand for ½ hour, diluted with water and taken up with methylene chloride. The methylene chloride extract is washed successively with 2% caustic soda and water, dried over sodium sulfate, filtered and evaporated in a vacuum. The crude N-acetyl-α-tocopheramine obtained can be purified by distillation in a high vacuum, whereby there is obtained a light-yellow oil of boiling point 235–240° C./0.08 mm.

15 g. of the N-acetyl-α-tocopheramine obtained are dissolved in 50 ml. of tetrahydro-furan. After the addition of 2.5 g. of lithium aluminium hydride, the solution is heated to boiling for 4 hours, carefully treated with methanol, then poured onto ice-cold normal sulfuric acid and extracted with methylene chloride. The extract is washed with water, dried over sodium sulfate, filtered, and evaporated in a vacuum. The residue obtained can be purified by chromatography on silica gel or by distillation. By the use of 500 g. of silica gel the N-ethyl-α-tocopheramine is eluted with ether after the removal of a forerun [by means of petroleum ether (boiling range 40–45° C.)/ether in the proportion 4:1]. This product is obtained in the form of a light-yellow oil; boiling point 211–214° C./0.01 mm.; U.V.-absorption maximum at 299 m$\mu$ ($E_1^1$=52) $n_D^{24.5}$=1.5086.

N-ethyl-γ-tocopheramine is obtained in an analogous manner starting from 2,3-dimethyl-4-formyl aminophenol; boiling point 195–197° C./0.05 mm.; U.V.-absorption maxima at 238 and 305 m$\mu$ ($E_1^1$=195 and 69); $n_D^{22.5}$=1.5083.

EXAMPLE 2

10 g. of the α-tocopheramine obtained according to Example 1 and 6 g. of 40% formaldehyde solution are heated to boiling for 16 hours in 9 g. of anhydrous formic acid. The reaction mixture is poured into water, taken up with ether, the ether extract washed with 2% caustic soda and water, dried over sodium sulfate, filtered and evaporated under reduced pressure. There is obtained N,N-dimethyl-α-tocopheramine which can be obtained as a light-yellow oil by distillation in a high vacuum. Boiling point: 200–205° C./0.02 mm., $n_D^{23}$=1.5015.

In an analogous manner there is obtained, starting from δ-tocopheramine, N,N-dimethyl-δ-tocopheramine of boiling point 183–188° C./0.007 mm.; $n_D^{19}$=1.5080; absorption maxima at 244 and 304 m$\mu$ ($E_1^1$=268; 58).

EXAMPLE 3

174 g. of N-formyl-2,3-dimethyl-4-amino-phenol are dissolved in 1 liter of anhydrous formic acid under nitrogen, treated with 220 g. of isophytol and heated at reflux for 22 hours. The reaction mixture is poured onto 2 kg. of ice, extracted with ether, the ethereal solution washed with 10% caustic soda and with water, dried over sodium sulfate and evaporated in a vacuum to dryness. There is obtained N-formyl-γ-tocopheramine which can be purified by chromatography on silica gel; boiling point 233° C./0.01 mm., $n_D^{24.5}$=1.5158.

30 g. of the N-formyl-γ-tocopheramine obtained are dissolved in 100 ml. of absolute tetrahydro-furan. After the addition of 6 g. of lithium aluminium hydride, the solution is heated to boiling for 5 hours, the cooled solution carefully treated with methanol and poured onto ice-cold N-sulfuric acid. The solution is taken up in ether, washed successively with water, 2% caustic soda, water, dried over sodium sulfate, filtered and evaporated in a vacuum. The reddish residue obtained can be purified by chromatography on silica gel or by distillation and there is obtained N-methyl-γ-tocopheramine as a light-yellow oil; boiling point 190–195° C.; $n_D^{22}$=1.5083; absorption maxima at 306 m$\mu$, $E_1^1$=74.

In an analogous manner there is obtained, starting from N-formyl-δ-tocopheramine N-methyl-δ-tocopheramine of boiling point 189–190° C./0.005 mm.; $n_D^{22.5}$=1.5106; U.V.-absorption maxima at 242 and 309 m$\mu$ ($E_1^1$=225 and 226). Starting from N-formyl-β-tocopheramine N-methyl-β-tocopheramine of boiling point 207–

210° C./0.03 mm.; $n_D^{21}=1.5088$; absorption maxima at 234 and 300 mμ ($E_1^1=182; 77$).

We claim:

1. An amine of the formula:

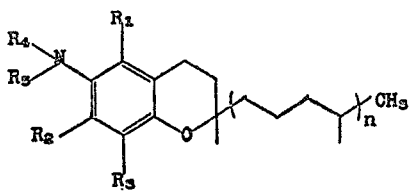

wherein $n$ is a natural number from 0 to 3 inclusive, $R_1$, $R_2$ and $R_3$ are each selected from the group consisting of hydrogen and methyl, $R_4$ is lower alkyl and $R_5$ is selected from the group consisting of hydrogen and lower alkyl.

2. An amine of the formula:

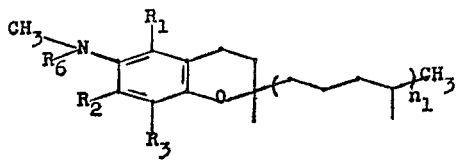

wherein $n_1$ is a whole number from 1 to 3 inclusive, $R_1$, $R_2$ and $R_3$ are each selected from the group consisting of hydrogen and methyl, and $R_6$ is selected from the group consisting of hydrogen and methyl.

3. An amine of the formula:

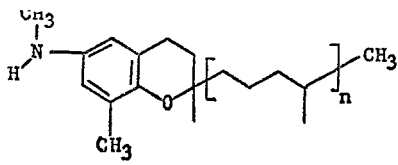

wherein $n$ is an integer from 0 to 3.

4. An amine of the formula:

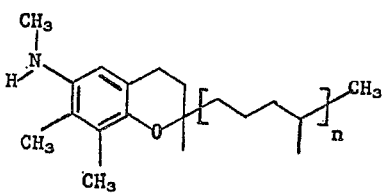

wherein $n$ is an integer from 0 to 3.

5. N-methyl-α-tocopheramine.
6. N,N-dimethyl-α-tocopheramine.
7. N-ethyl-α-tocopheramine.
8. N,N-diethyl-α-tocopheramine.
9. N-methyl-β-tocopheramine.
10. N,N-dimethyl-β-tocopheramine.
11. N-ethyl-β-tocopheramine.
12. N,N-diethyl-β-tocopheramine.
13. N-methyl-γ-tocopheramine.
14. N,N-dimethyl-γ-tocopheramine.
15. N-ethyl-γ-tocopheramine.
16. N,N-diethyl-γ-tocopheramine.
17. N-methyl-δ-tocopheramine.
18. N,N-dimethyl-δ-tocopheramine.
19. N-ethyl-δ-tocopheramine.
20. N,N-diethyl-δ-tocopheramine.
21. N-isopropyl-γ-tocopheramine.

References Cited

UNITED STATES PATENTS

| | | | |
|---|---|---|---|
| 2,354,317 | 7/1944 | Hromatka | 260—345.2 X |
| 2,358,287 | 9/1944 | Hromatka | 260—345.2 X |
| 2,421,812 | 6/1947 | Smith et al. | 260—345.2 X |
| 3,004,040 | 10/1961 | Pendse et al. | 260—345.2 X |

NORMA S. MILESTONE, *Acting Primary Examiner.*

J. M. FORD, *Assistant Examiner.*